(12) United States Patent
Danel

(10) Patent No.: US 7,922,962 B2
(45) Date of Patent: Apr. 12, 2011

(54) BLOWING PLANT COMPRISING A NOZZLE PROVIDED WITH A LIP SEALING JOINT

(75) Inventor: Laurent Danel, Octeville sur Mer (FR)

(73) Assignee: Sidel Participations, Octeville-sur-Mer (FR)

( * ) Notice: Subject to any disclaimer, the term of this patent is extended or adjusted under 35 U.S.C. 154(b) by 508 days.

(21) Appl. No.: 12/063,031

(22) PCT Filed: Jul. 13, 2006

(86) PCT No.: PCT/EP2006/064188
§ 371 (c)(1),
(2), (4) Date: Aug. 6, 2008

(87) PCT Pub. No.: WO2007/020137
PCT Pub. Date: Feb. 22, 2007

(65) Prior Publication Data
US 2010/0151073 A1 Jun. 17, 2010

(30) Foreign Application Priority Data

Aug. 12, 2005 (FR) ..................................... 05 52509

(51) Int. Cl.
*B29C 49/58* (2006.01)
(52) U.S. Cl. ........................................ 264/523; 425/535
(58) Field of Classification Search .................. 425/535; 264/523
See application file for complete search history.

(56) References Cited

U.S. PATENT DOCUMENTS

| 4,552,527 A | 11/1985 | Hunter |
| 6,464,486 B1 | 10/2002 | Barray et al. |
| 7,758,333 B2 * | 7/2010 | Halbo et al. ................. 425/535 |
| 2004/0202747 A1 | 10/2004 | Evrard |
| 2010/0143531 A1 * | 6/2010 | Derrier et al. ................. 425/535 |

FOREIGN PATENT DOCUMENTS

| FR | 2 764 544 A | 12/1998 |
| FR | 2 833 512 A | 6/2003 |

* cited by examiner

*Primary Examiner* — Robert B Davis
(74) *Attorney, Agent, or Firm* — Young & Thompson

(57) ABSTRACT

The invention relates to a plant (10) for blowing a pressure medium in a blank (12), which comprises a mould (12) which is used for receiving the blank (12) and comprises a top wall (24) trough which the neck (16) of the blank (12) is projected, a nozzle (22) which comprises a pressure medium lower output orifice (34) and is provided with an ring sealing joint (40) arranged under the lower circumference (44) of said output orifice (34) in such a way that the circumference (44) of the output orifice (34) surrounds the neck (16) of the blank (12). Said invention is characterised in that the sealing joint (40) is provided with a lower elastic annular lip (48) in such a way that the pressure medium rests on the top face (54) of said lip (48) for pressing the free annular lower edge (58) thereof against a supporting wall (18, 24), thereby ensuring the tightness of the nozzle (22).

15 Claims, 3 Drawing Sheets

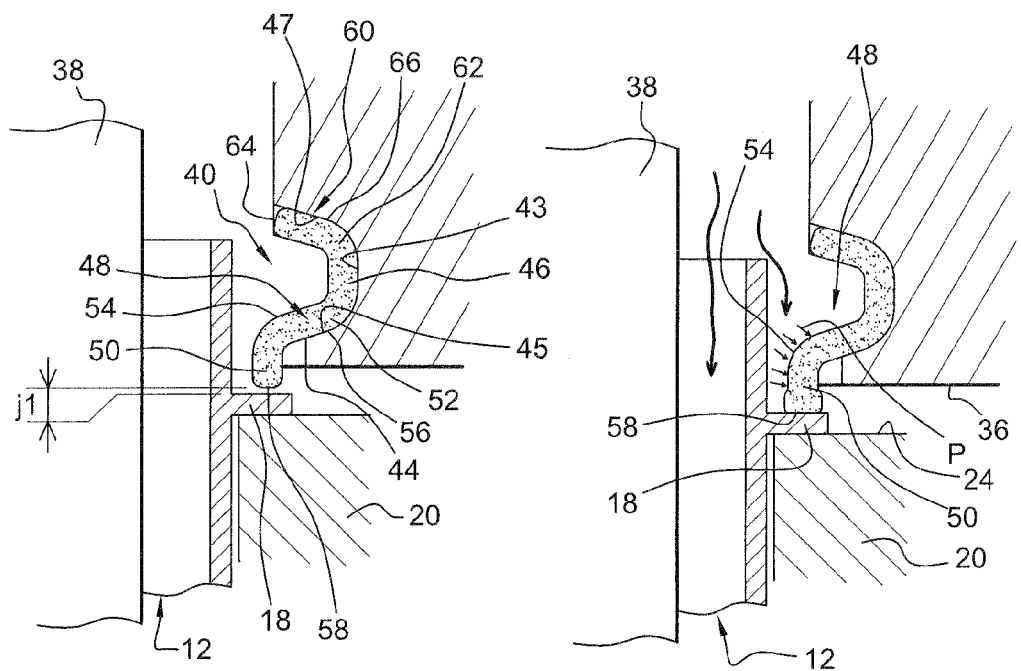
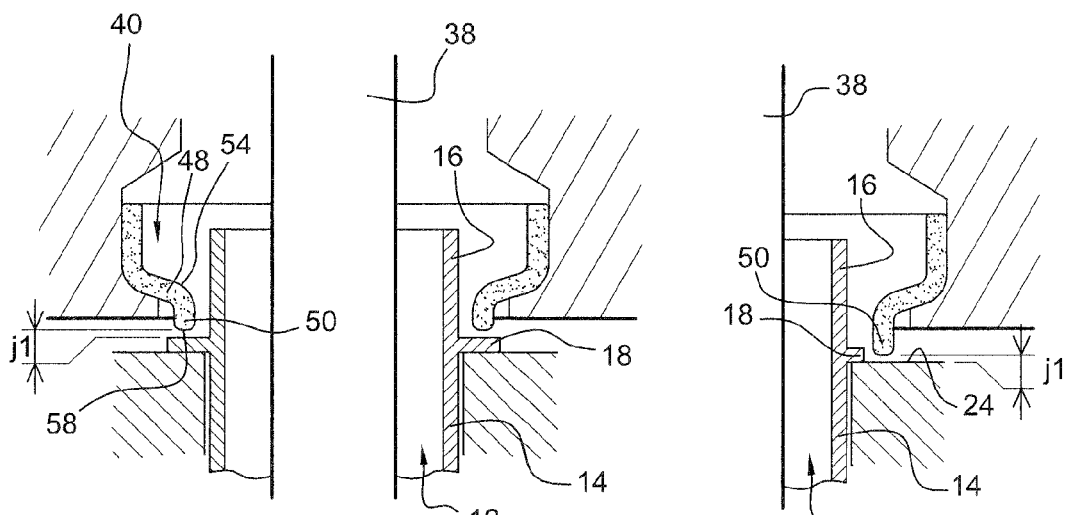

BLOWING PLANT COMPRISING A NOZZLE PROVIDED WITH A LIP SEALING JOINT

The invention relates to a plant for blowing a pressurized fluid into a blank.

The invention relates more particularly to a plant for blowing a pressurized fluid into a blank, especially into a blank for a PET container, which comprises:

a lower mold which is intended to house the blank, and which comprises an upper horizontal wall comprising an insertion orifice through which an upper neck of the blank is intended to project;

an upper nozzle which comprises a lower outlet orifice for the pressurized fluid which is intended to blow the pressurized fluid into the blank via the neck (16), and which comprises an annular seal which is arranged under the lower circumference of the outlet orifice;

of the type in which the circumference of the outlet orifice is intended to be positioned opposite a bearing wall surrounding the neck of the blank, the seal being pressed against the bearing wall to prevent the pressurized fluid from leaking between the circumference (44) of the outlet orifice (34) of the nozzle (22) and the bearing face (18, 24).

This type of plant is especially used for manufacturing containers, for example bottles, made of plastic starting from blanks, also called preforms. The blanks are converted to bottles by a blow-molding operation and, optionally, by a simultaneous stretching operation.

Prior to the blow-molding operation, the preforms are heated to soften the material that forms them. These preheated preforms are then arranged in a mold, the impression of which has the shape of the final bottle.

Finally, a pressurized fluid, such as air, is injected inside the preform via a blowing nozzle. The pressurized fluid deforms the body of the preform like a balloon that is inflated so that the preform adopts the contours of the impression of the mold to form the definitive bottle.

"Bell"-type blow-molding nozzles are already known. In this type of nozzle, the outlet orifice of the downstream end of the nozzle is bell-shaped. The circumference of the outlet orifice is pinned against the mold so as to surround the neck of the preform. Thus, the neck of the preform is encircled by the bell.

During blow molding, the space contained radially between the neck of the preform and the bell is filled with pressurized fluid.

It is known to position a seal under the circumference of the outlet orifice of the nozzle so that, when the nozzle injects the pressurized fluid inside the preform, the pressurized fluid does not leak between the bearing face of the mold and the circumference of the nozzle.

So that the fluid does not leak, the circumference of the outlet orifice is pressed against the bearing face of the mold through the seal. The circumference of the nozzle is firmly pressed against the bearing face of the mold so as to compress the seal with a force greater than that produced by the pressurized fluid against the seal.

The force which the nozzle must exert against the bearing face of the mold requires a powerful, bulky and expensive actuator.

Furthermore, since the mold and the nozzle are subjected to forces of very high intensity, they must be attached in a reinforced manner to the blow-molding plant. These reinforced attachment means are expensive, heavy and bulky.

In order to solve these problems, the invention provides a nozzle of the type described previously, characterized in that the seal comprises at least one first flexible lower annular lip which extends radially toward the inside of the outlet orifice, so that the pressurized fluid presses on an upper face of the lip to pin the free inside edge of the annular lip against the bearing wall to ensure the sealing of the nozzle.

According to other features of the invention:

the bearing wall is formed by a collar which extends horizontally around the neck of the blank;

the bearing wall is formed by the upper wall of the mold;

the seal comprises an annular upper second lip which is positioned in parallel above the lower first lip and which is connected to the lower first lip by an outer peripheral rim of the seal;

the radial cross section of the seal has a "U" shape of which the opening directed radially toward the inside of the nozzle is bordered vertically by the lower first lip and by the upper second lip;

the inner cylindrical face of the nozzle comprises an annular groove in which the seal is housed;

an outer annular portion of the lower face of the lower first lip is pressed against a lower wall of the annular groove; and the free inner circular edge of the lower first lip forms an annular projection which extends vertically downward relative to a lower face of the nozzle and which is intended to be pressed against the bearing wall when the pressurized fluid presses on the upper face of the lower first lip.

The invention also relates to a blowing process using a blow-molding plant produced according to the invention, characterized in that, in a low, blowing position of the nozzle in which the inner annular portion of the lower face is pressed against the bearing face of the mold, the circumference of the outlet orifice is positioned above the bearing face of the mold so that there is a vertical gap between the lower face of the nozzle and the bearing face of the mold.

Other features and advantages will appear on reading the detailed description which follows, for the understanding of which reference will be made to the appended drawings among which:

FIG. 3 is a larger scale axial cross-sectional view that represents the seal of the nozzle from FIG. 2;

FIG. 4 is a view similar to that from FIG. 3 in which the nozzle emits a pressurized fluid that presses a lower lip of the seal against the mold;

FIG. 5 is a view similar to that from FIG. 3 which represents a variant of the invention; and FIG. 6 is a view similar to that from FIG. 3 which represents a variant of the invention.

Figure 1:
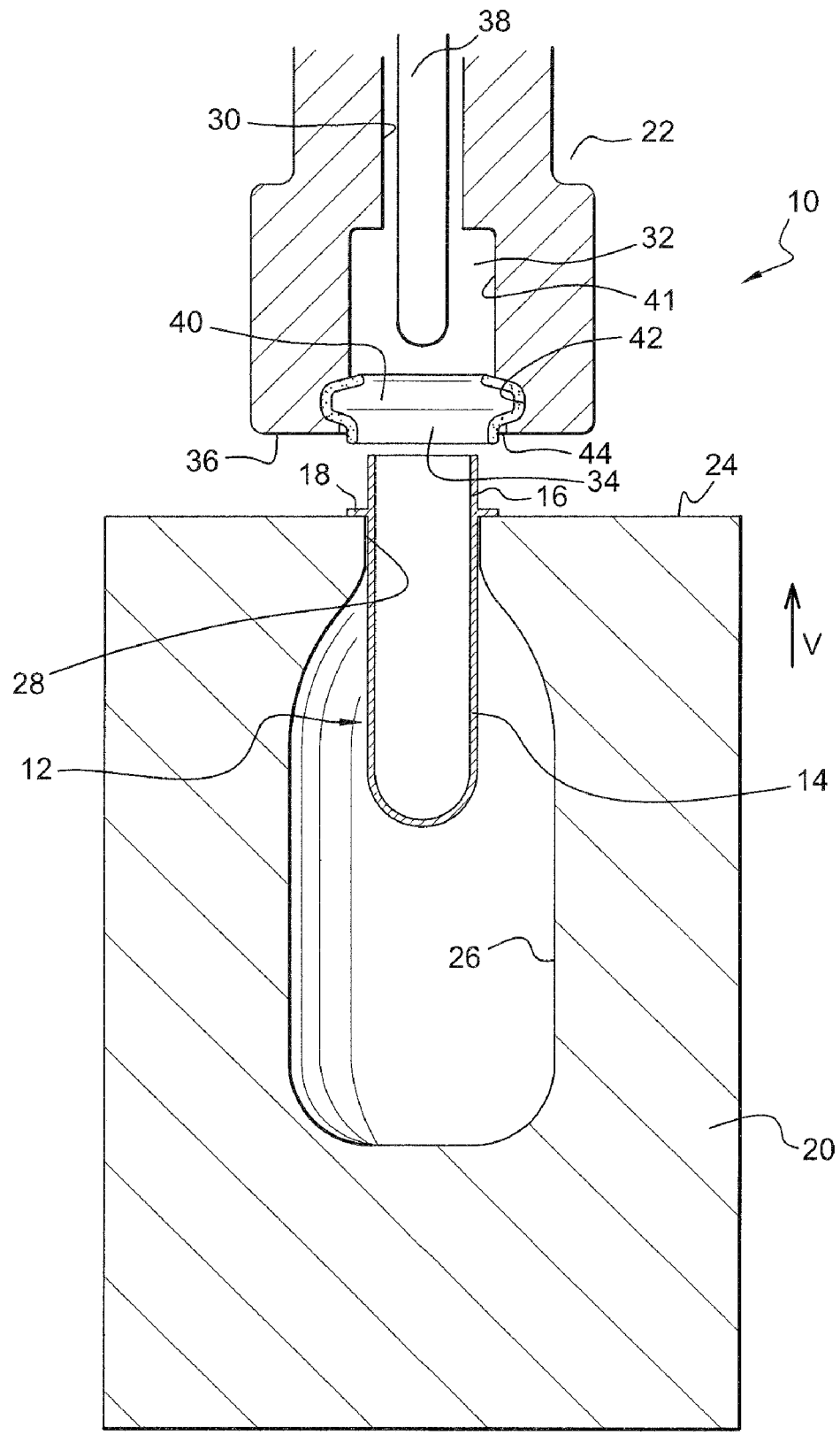
FIG. 1 is an axial cross-sectional view that represents a blow-molding plant produced according to the invention in which a blowing nozzle is in a high, rest position relative to a mold.

For the remainder of the description, a vertical orientation, which is directed from the bottom to the top, and which is indicated by the arrow V from FIG. 1, will be adopted in a nonlimiting fashion. A plane perpendicular to this direction will be said to be "horizontal".

Subsequently, identical, analogous or similar components will be denoted by the same reference numbers.

Represented in FIG. 1 is a blow-molding plant 10 for blow-molding containers, and especially bottles, starting from a preform 12 plastic, for example polyethylene terephthalate (PET).

As represented in FIG. 1, the preform 12 comprises a lower body 14 which here has the shape of a cylindrical tube, the lower end of which is sealed.

The upper end of the preform 12 is open via an upper neck 16, of which the outer cylindrical face comprises a thread (not shown). A collar 18 extends radially projecting from the outer cylindrical face of the neck 16. The collar 18 vertically delimits the neck 16 relative to the body 14 of the preform 12.

The body 14 of the preform 12 is intended to be deformed by blow molding so as to be converted to the final container. For this purpose, the body 14 of the preform 12 is softened by heating before being subjected to the blow-molding operation.

The neck 16 of the preform 12 already has its definitive form; it is therefore not subjected to the blow-molding operation.

The blow-molding plant 10 mainly comprises a mold 20 and a nozzle 22.

In a known manner, the mold 20 is formed from a block of material which is delimited at the top by an upper horizontal wall 24. A cavity 26 is kept inside the mold 20. The cavity 26 opens into the upper wall 24 of the mold 20 via an insertion orifice 28.

The body 14 of the preform 12 for the plastic container is inserted into the cavity 26 of the mold 20 through the insertion orifice 28.

Only the body 14 of the preform 12 is inserted inside the cavity 26 whilst the neck 16 remains outside of the mold 20. For this purpose, the outline of the insertion orifice 28 is sized to allow the body 14 of the preform 12 to pass through it, but it is not large enough to let the collar 18 of the preform 12 pass through it.

The collar 18 thus forms a stop which rests against the upper wall 24 of the mold 20 so as to prevent the preform 12 from falling into the cavity 26. The neck 16 thus projects upward relative to the upper wall 24 of the mold 20.

Figure 2:
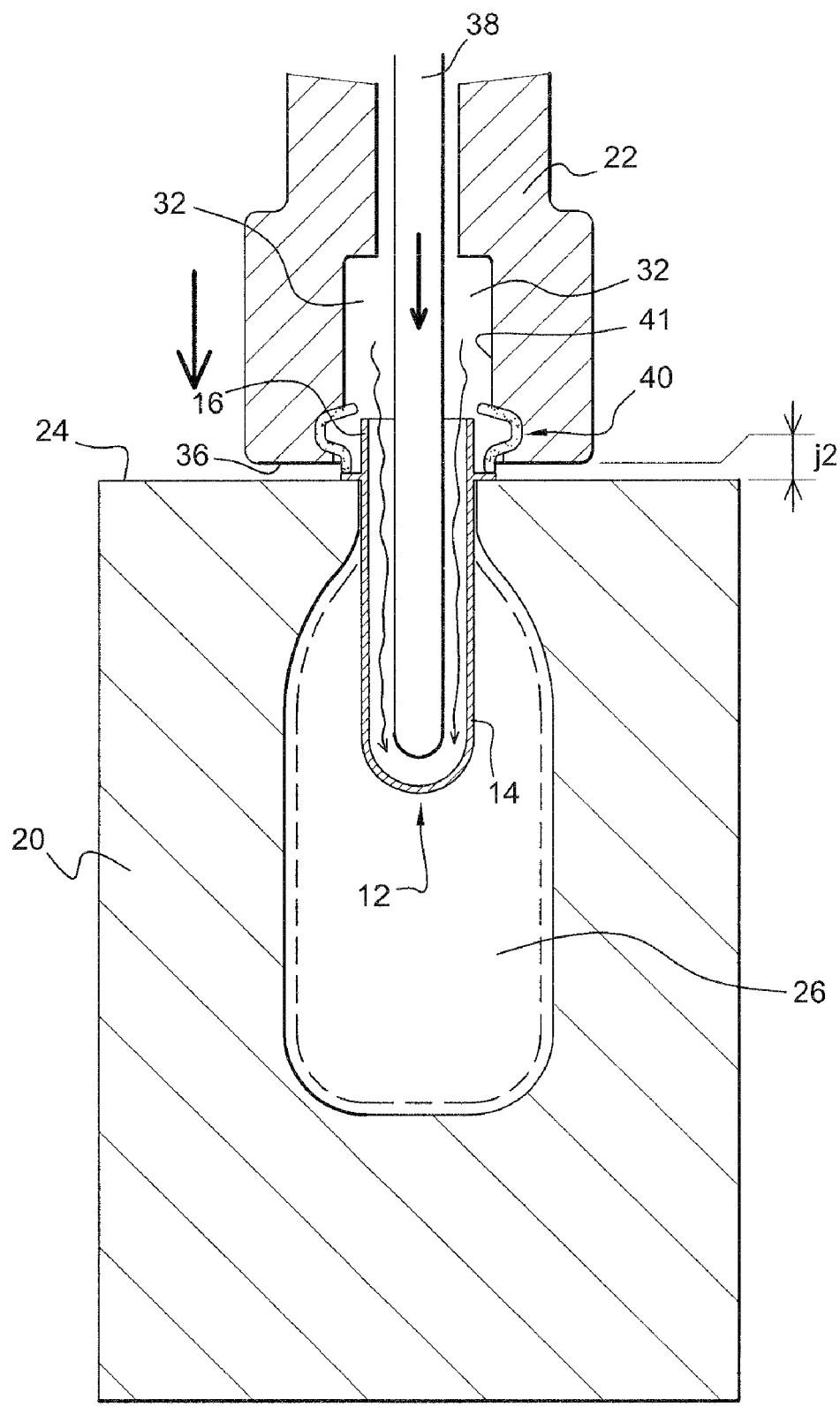
FIG. 2 is an axial cross-sectional view that represents the blow-molding plant from FIG. 1 and in which the nozzle is in a low, blowing position.

The cavity 26 of the mold 20 forms the impression of the definitive container that the body of the preform 22 is intended to adopt, as shown by broken lines in FIG. 2.

The nozzle 22 is placed vertically above the upper wall 24 of the mold 20, in line with the neck 16 of the preform 12.

The nozzle 22 comprises a pressurized fluid supply duct 30 having a vertical axis. A downstream lower end section of the supply duct 30 is downwardly flared in the shape of a bell down to an outlet orifice 34 for the pressurized fluid. This section will subsequently be called the bell 32.

The circumference 44 of the outlet orifice 34 is capable of surrounding the neck 16 of the preform 12 so that the neck 16 is completely covered by the bell 32.

The lower end of the nozzle 22 is delimited by a lower horizontal face 36 which is positioned opposite the upper wall 24 of the mold 20.

The nozzle 22 here comprises a stretch rod 38 of a vertical axis which is vertically mounted in a sliding fashion inside the supply duct 30. The stretch rod 38 is intended to come to rest on the bottom of the body 14 of the preform 12 in order to allow good distribution of the plastic forming the body of the final container during the blow-molding operation.

In a known manner, the nozzle 22 is mounted so that it slides between a high, rest position which is represented in FIG. 1, and a low, blowing position in which the neck 16 of the preform 12 is encompassed within the bell 32 which is represented in FIG. 2.

When the nozzle 22 is in its low blowing position, the blow-molding operation is carried out. A pressurized fluid is than blown downward through the outlet orifice 34 so as to penetrate inside the preform 12 via the neck 16 to deform the body 14 of the preform 12 in order to conform to the impression of the cavity 18 of the mold 20.

A radial space remains between the neck 16 and the bell 32. This radial space is filled with pressurized fluid during the blow-molding operation.

According to the teachings of the invention, the nozzle 22 comprises an annular seal 40 which is arranged under the circumference of the outlet orifice 34 of the nozzle 22.

In a known manner, the annular seal 40 is made from an elastomeric material.

The annular seal 40 is intended to prevent leaks of pressurized fluid between the circumference 44 of the outlet orifice 34 and the upper wall 24 of the mold 20 when the nozzle 22 is in the low, blowing position.

The inner cylindrical wall 41 of the bell 32 comprises an annular groove 42 which is positioned in the vicinity of the circumference 44 of the outlet orifice 34. The groove 42 is intended to house the annular seal 40.

The groove 42 is open radially toward the inside of the orifice of the bell 32. It is delimited radially toward the outside by a vertical back 43 and it is delimited vertically by a lower wall 45 that in the main points horizontally downward and by an upper wall 47 that in the main points horizontally upward.

As represented in FIG. 3, the annular seal 40 comprises an outer annular peripheral rim 46 which is positioned against the back 43 of the groove 42.

The annular seal 40 also comprises a first lower annular lip 48 which extends radially from a lower circular end edge of the rim 46 toward the inside of the outlet orifice 34. The lower first lip 48 comprises a free inner circular edge 50 while its outer circular edge 52 is formed as one in the same part with the lower circular edge of the rim 46.

The first lower lip 48 is flexible, that is to say that it can be deformed elastically so that the free inner circular edge 50 moves vertically about its equilibrium position while the outer circular edge 52 remains immobile.

The lower first lip 48 comprises an upper, in the main horizontal, face 54 which is exposed to the pressurized fluid blown by the nozzle 22.

The lower face of the lower first lip 48 is positioned so as to overhang the lower wall 45 of the groove 42. Thus, an outer annular portion of the lower face 56 rests against a horizontal lower surface of the groove 42. An inner annular portion of the lower face 58 of the lower first lip 48, which is adjacent the free inner circular edge 50, is unsupported.

The inner annular portion of the lower face 58 is intended to be pressed against a bearing wall so as to prevent the pressurized fluid from leaking. As shown in FIGS. 2, 3 and 4, the inner annular portion of the lower face 58 of the lower first lip 48 here rests against the upper face of the collar 18 of the preform 12 which here forms the bearing wall.

According to one variant which is represented in FIG. 6, the inner annular portion of the lower face 58 is intended to be pressed directly against the upper wall 24 of the mold 20 which then forms the bearing wall. The inner annular portion of the lower face 58 then surrounds the collar 18 of the preform 12.

The free inner circular edge 50 of the lower first lip 48 here comprises an annular projection which extends vertically downward so that the annular portion of the inner annular portion of the lower face 58 of the lower first lip 48 projects vertically downward relative to the lower face 36 of the nozzle 22.

Advantageously, as represented in FIGS. 1 to 4, the annular seal 40 comprises an annular upper second lip 60. The upper second lip 60 extends radially from the upper circular end edge 62 of the rim 46 toward the inside of the outlet orifice 34.

The annular seal 40 therefore comprises an annular groove which is delimited by the lower first lip 48, by the upper second lip 60 and by the rim 46.

Thus, as represented in FIGS. 3 and 4, the axial radial cross section of the seal forms a "U" of which the opening is oriented radially toward the inside of the outlet orifice 34, the opening of the "U" being bordered underneath by the lower first lip 48 and above by the upper second lip 60.

The upper second lip 60 comprises a free inner circular edge 64. The upper face 66 of the upper second lip 60 rests against the upper wall 47 with respect to the groove 42.

The free inner circular edge 64 is flush with the inner cylindrical wall 41 of the bell 32. Thus, the upper face 66 of the upper second lip 60 is not exposed to the pressure of the pressurized fluid when the nozzle 22 is in the low, blowing position.

According to one variant of the invention which is represented in FIG. 5, the annular seal 40 only comprises the lower first lip 48.

However, the inventors have surprisingly observed that the presence of an upper second lip 60 that forms a circular groove in the annular seal 40 made it possible to obtain a bearing force of the lower first lip 48 bearing against the collar 18 that was stronger than with a single lip.

The operation of such a blow-molding plant 10 will now be described.

As represented in FIG. 1, when the nozzle 22 is in the rest position, the lower face 36 of the nozzle 22 is positioned at a distance above the upper wall 24 of the mold 20, and the outlet orifice 34 is positioned in line with the neck 16 of the preform 12.

Then, the nozzle 22 is dropped to its low, blowing position as represented in FIG. 2. As represented in greater detail in FIG. 3, when the nozzle 22 is in the low, blowing position and when it is not blowing pressurized fluid, the inner annular portion of the lower face 58 of the first lip 48 is arranged in the vicinity of the collar 18 of the preform 12 so that there remains a slight gap "j1" between the seal 40 and the collar 18.

Advantageously, there remains a second gap "j2" between the inner face 36 of the nozzle 22 and the upper wall 24 of the mold 20. This second gap "j2" is maintained due to the inner annular portion of the lower face 58 of the lower first lip 48 which juts out. By avoiding any contact between these two surfaces, wearing of the mold 20 and of the nozzle 22 is prevented.

The annular seal 40 thus surrounds the neck 16 of the preform 12 so that a radial space remains.

Then, the nozzle injects pressurized fluid inside the preform 12 through the neck 16.

As represented in FIG. 4, when the pressurized fluid is blown, some of the pressurized fluid accumulates in the space radially delimited by the annular seal 40 and the neck 16. The pressurized fluid presses on the upper face 54 of the lower first lip 48 as represented by the arrows "P" from FIG. 4.

The pressure deforms the lower first lip 48 so that the inner annular portion of the lower face 58 of the lower first lip 48 is firmly pressed against the collar 18. The pressure exerted by the pressurized fluid on the lower first lip 48 makes it possible to obtain sufficient sealing so the pressurized fluid does not leak radially toward the outside between the inner face 36 of the nozzle 22 and the upper wall 24 of the mold 20.

At the same time as the blow-molding operation, the stretch rod 38 is slid vertically downward so that it presses against the bottom of the preform 12 in order to vertically stretch the body 14 of the preform 12 downward.

Thanks to the blow-molding plant produced according to the teachings of the invention, it is no longer necessary to firmly press the nozzle 22 against the mold 20 to prevent the pressurized fluid from leaking out of the nozzle 22.

The invention claimed is:

1. A plant (10) for blowing a pressurized fluid into a blank (12), especially into a blank for a PET container, which comprises:
    a lower mold (12) which is intended to house the blank (12), and which comprises an upper horizontal wall (24) comprising an insertion orifice (28) through which an upper neck (16) of the blank (12) is intended to project;
    an upper nozzle (22) which comprises a lower outlet orifice (34) for the pressurized fluid which is intended to blow the pressurized fluid into the blank via the neck (16), and which comprises an annular seal (40) which is arranged under the lower circumference (44) of the outlet orifice (34);
    of the type in which the circumference (44) of the outlet orifice (34) is intended to be positioned opposite a bearing wall (18, 24) surrounding the neck (16) of the blank (12), the seal (40) being pressed against the bearing wall (18, 24) to prevent the pressurized fluid from leaking between the circumference (44) of the outlet orifice (34) of the nozzle (22) and the bearing face (18, 24),
    characterized in that the seal (40) comprises at least one first flexible annular lower lip (48) which extends radially toward the inside of the outlet orifice (34), so that the pressurized fluid presses on an upper face (54) of the lip (48) so as to pin the free inside circular edge (58) of the annular lip (48) against the bearing wall (18, 24) to ensure the sealing of the nozzle (22).

2. The blow-molding plant (10) as claimed in claim 1, characterized in that the bearing wall is formed by a collar (18) which extends horizontally around the neck (16) of the blank (12).

3. The blow-molding plant (10) as claimed in claim 1, characterized in that the bearing wall is formed by the upper wall (24) of the mold (20).

4. The blow-molding plant (10) as claimed in claim 1, characterized in that the seal (40) comprises an annular upper second lip (60) which is positioned in parallel above the lower first lip (48) and which is connected to the lower first lip (48) by an outer peripheral rim (46) of the seal (40).

5. Blow-molding plant (10) as claimed in claim 1, characterized in that the radial cross section of the seal (40) has a "U" shape of which the opening directed radially toward the inside of the nozzle (22) is bordered vertically by the lower first lip (48) and by the upper second lip (60).

6. The blow-molding plant (10) as claimed in claim 1, characterized in that the inner cylindrical face (41) of the nozzle (22) comprises an annular groove (42) in which the seal (40) is housed.

7. The blow-molding plant (10) as claimed in claim 6, characterized in that an outer annular portion of the lower face (56) of the lower first lip (48) is pressed against a lower wall (45) of the annular groove (42).

8. The blow-molding plant (10) as claimed in claim 7, characterized in that the free inner circular edge (50) of the lower first lip (48) forms an annular projection which extends vertically downward relative to a lower face (36) of the nozzle (22) and which is intended to be pressed against the bearing wall (18, 24) when the pressurized fluid presses on the upper face (54) of the lower first lip (48).

9. A blowing process using a blow-molding plant (10) produced as claimed in claim 1, characterized in that, in a low, blowing position of the nozzle (22) in which the inner annular portion of the lower face (58) is pressed against the bearing face (24) of the mold (20), the circumference (44) of the outlet orifice (34) is positioned above the bearing face of the mold so that there is a vertical gap between the lower face (36) of the nozzle (22) and the bearing face (24) of the mold (20).

10. The blow-molding plant (10) as claimed in claim 2, characterized in that the seal (40) comprises an annular upper second lip (60) which is positioned in parallel above the lower first lip (48) and which is connected to the lower first lip (48) by an outer peripheral rim (46) of the seal (40).

11. The blow-molding plant (10) as claimed in claim 3, characterized in that the seal (40) comprises an annular upper second lip (60) which is positioned in parallel above the lower first lip (48) and which is connected to the lower first lip (48) by an outer peripheral rim (46) of the seal (40).

12. The blow-molding plant (10) as claimed in claim 2, characterized in that the inner cylindrical face (41) of the nozzle (22) comprises an annular groove (42) in which the seal (40) is housed.

13. The blow-molding plant (10) as claimed in claim 3, characterized in that the inner cylindrical face (41) of the nozzle (22) comprises an annular groove (42) in which the seal (40) is housed.

14. The blow-molding plant (10) as claimed in claim 4, characterized in that the inner cylindrical face (41) of the nozzle (22) comprises an annular groove (42) in which the seal (40) is housed.

15. The blow-molding plant (10) as claimed in claim 5, characterized in that the inner cylindrical face (41) of the nozzle (22) comprises an annular groove (42) in which the seal (40) is housed.

* * * * *